United States Patent [19]
McNair et al.

[11] Patent Number: 5,595,342
[45] Date of Patent: Jan. 21, 1997

[54] CONTROL SYSTEM

[75] Inventors: Henry P. McNair, New Malden; Christos P. Bakopoulos, London, both of United Kingdom

[73] Assignee: British Gas plc, London, United Kingdom

[21] Appl. No.: 248,241

[22] Filed: May 24, 1994

[30] Foreign Application Priority Data

| May 24, 1993 | [GB] | United Kingdom | 9310666 |
| May 24, 1993 | [GB] | United Kingdom | 9310667 |
| May 24, 1993 | [GB] | United Kingdom | 9310668 |

[51] Int. Cl.$^6$ .................................................. G05D 23/00
[52] U.S. Cl. ........................................ 236/51; 340/539
[58] Field of Search .............................. 236/51, 46 R, 236/1 B; 340/539; 165/22

[56] References Cited

U.S. PATENT DOCUMENTS

| 4,734,680 | 3/1988 | Gehman et al. | 340/539 |
| 5,114,070 | 5/1992 | Lilja et al. | 236/51 X |
| 5,224,648 | 7/1993 | Simon et al. | 236/51 |
| 5,318,224 | 6/1994 | Darby et al. | 236/51 X |
| 5,390,206 | 2/1995 | Rein et al. | 236/51 X |

*Primary Examiner*—Harry B. Tanner
*Attorney, Agent, or Firm*—Oblon, Spivak, McClelland, Maier & Neustadt, P.C.

[57] ABSTRACT

A boiler control system includes a room temperature sensor 10 which utilises radio transmission to send temperature information via antenna 11 to receiver 15 via antenna 16. The receiver will provide an output to a control unit 18 to cause actuation of the boiler 19 for example if the room temperature falls below a preset value. The temperature selected can be varied by means of up/down keys 13/14 on the sensor 10. Temperature information can be displayed by means of display 12. Unique coding identifies the transmitting sensor and transmission can be sequenced on a number of frequencies to reduce the risk of reception failure. Additional temperature sensors including a hand held unit each with a unique identity code can be used and transmission time is varied to avoid coincident transmission from the sensors. Telephone linkage for a number of devices can be provided.

43 Claims, 19 Drawing Sheets

CONTROL SYSTEM

The invention relates to a control system and more specifically to a control system typically for a central heating system which may be gas fired.

One aspect of the invention is concerned with reducing wiring requirements. The room thermostat normally provided will typically be located in a different room to the boiler and its associated control unit and have electrical wiring therebetween.

According to the invention there is provided a control system for a heating or cooling arrangement incorporating a heating/cooling device, said control system comprising: control means for providing operational control of the heating/cooling device; at least one temperature sensor device including radio transmission means remote from the control means for providing temperature information for transmission to the control means to allow said control means to receive said information to determine whether to operate the heating/cooling device, said radio transmission means including means for reducing the risk of loss of reception of the information by the control means.

Further according to the invention there is provided a method for controlling a heating or cooling arrangement incorporating a heating/cooling device, said method including the steps of:

sensing a temperature remote from the heating/cooling device;

transmitting temperature information to the device using radio signals in such a manner as to reduce the risk of loss of reception; and receiving the transmitted information to determine whether to activate/deactivate the heating/cooling device.

The invention will now be described by way of example with reference to the accompanying drawings in which.

Figure 1:
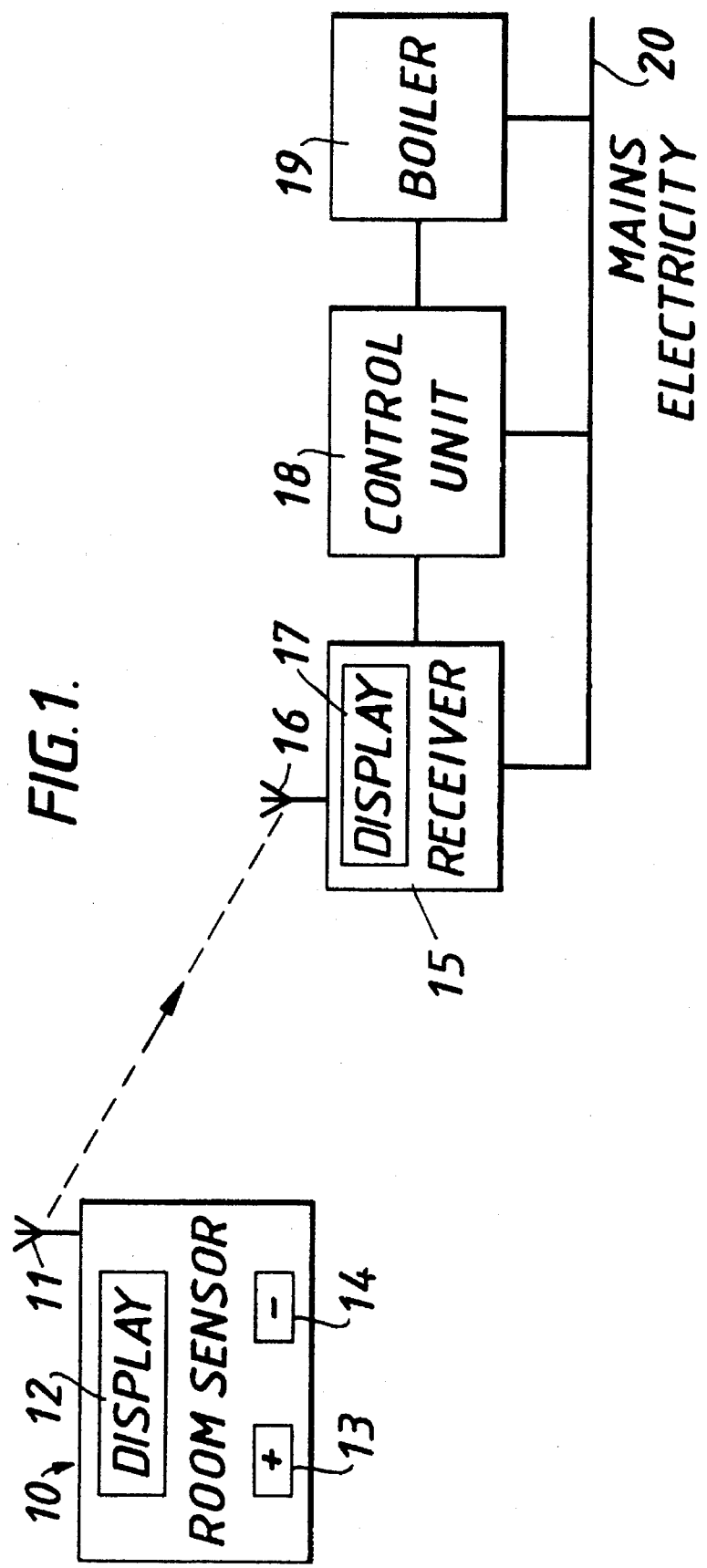
FIG. 1 shows a first embodiment of a control system for a boiler including a remote temperature sensor.

The FIG. 1 arrangement shows a central heating system including a room temperature sensor device 10 with a display 12 and push buttons 13 and 14 for increasing or decreasing the temperature setting.

The device 10 includes a wireless transmitter for transmitting signals via antenna 11 to antenna 16 of a receiver 15 typically associated with the control of the boiler. The receiver 15 includes a display 17. The receiver is connected to the normal boiler control unit 18 which unit controls boiler 19 connected thereto. Electrical mains supply 20 provides power for the receiver 15 and the control unit 17. The signals received via antenna 16 will typically include sensor identity, temperature setting data and actual measured temperature and this information is processed by receiver 15 to cause it to operate the boiler when the room temperature falls below that set or to switch off the boiler when the temperature rises substantially above the setting.

Figure 2:
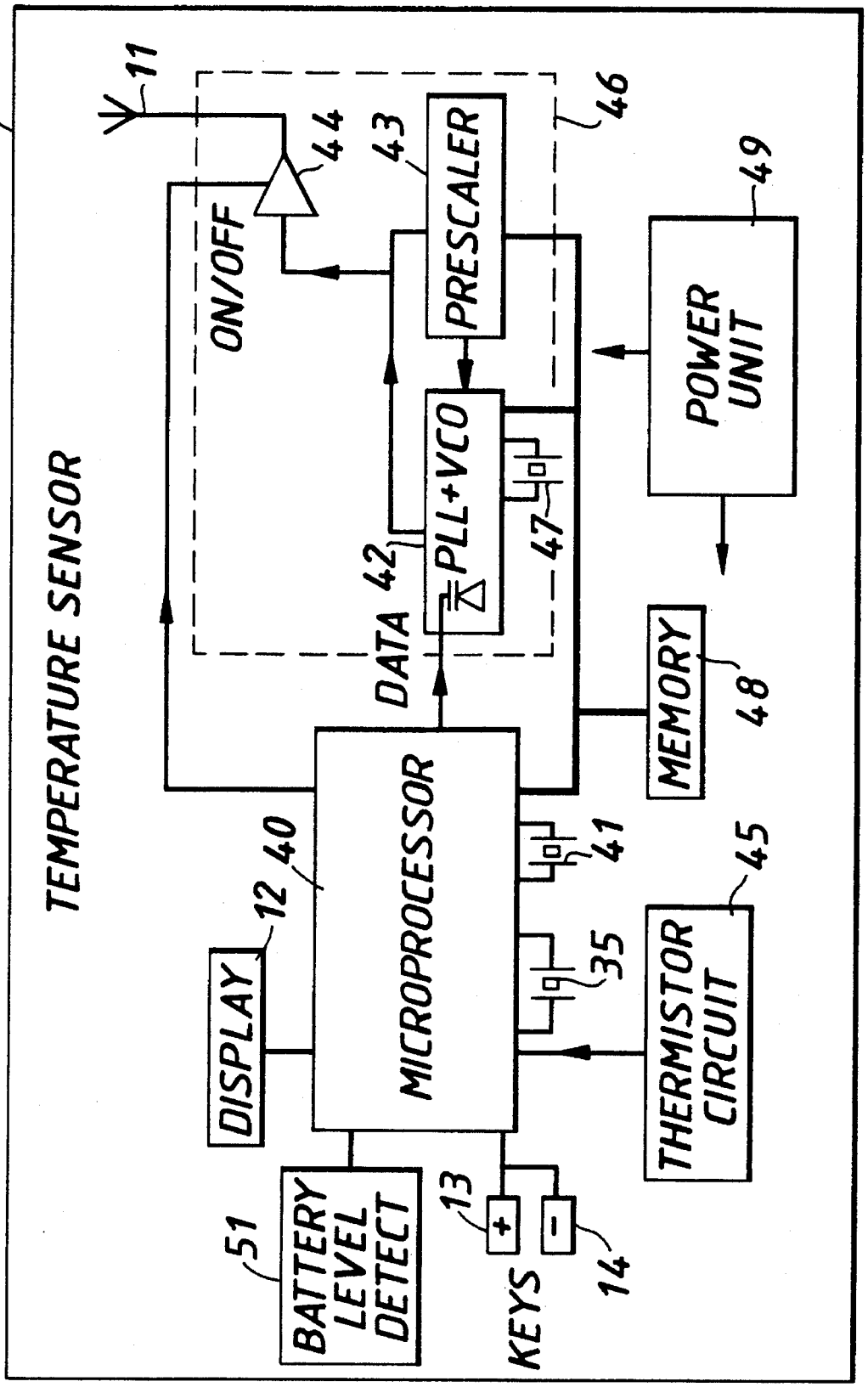
FIG. 2 shows an embodiment of the remote temperature sensor in more detail.

The temperature sensor of FIG. 1 is shown in more detail in FIG. 2.

A microprocessor 40 provides internal control and will typically be of the single chip type (e.g. TMP47C446) having an inbuilt processor, Random Access Memory (RAM), a Read Only Memory (ROM) for storing sequencing instructions and a clock generation circuit for providing sequencing pulses. An external crystal 41 is shown to provide an accurate fixed frequency source for clock pulse generation and an external crystal 35 is provided for real time clock functions. A thermistor circuit 45 with suitable interfacing connections to the microprocessor is included to provide a means of determining the temperature. The thermistor is shown located within the module housing. A battery level sensing circuit 51 is also provided.

The desired temperature can be set for the room sensor by means of up/down keys 13/14. A display 12 can display the current room temperature and typically when key 13 or 14 is pressed the set temperature. Alternatively an additional button or key can be provided to switch between the two readings. Additionally time of day could be displayed due to the presence of the real time clock function governed by crystal 50.

A transmitter circuit 46 includes a prescaler 43 (e.g. TD6134AF), a frequency synthesiser 42 with an internal voltage controlled oscillator and phase-locked loop (e.g. NJ88C33) with associated crystal 47 for an accurate fixed frequency reference source. For frequency synthesis, the oscillator frequency is divided down by the prescaler by a number (N) to that desired for a transmission frequency and this is compared to the reference frequency to ensure accuracy is maintained. The feedback from the phase-locked loop will correct any errors. A gated buffer/operational amplifier 44 receives the output from the transmitter to allow transmission of the signal when instructed by the microprocessor 40. Typically transmission could be around 173 MHz using frequency modulation (FM) techniques. More specifically, frequency shift keying (FSK) can be employed to generate two different frequencies corresponding to the two logic states of the binary data being sent for transmission. An additional memory 48 provides non-volatile storage of a code identifying which particular sensor module is transmitting to ensure the receiver 15 of FIG. 1 is capable of determining the source. This is to avoid problems with spurious transmissions received from a sensor module fitted in an adjacent property. A unique code will be stored in each remote module and is available to the microprocessor bus. An internal power unit 49, in this case a battery pack, provides power for the device.

Thus the transmission can include device identification, preset temperature (stored in memory 48), actual temperature and on occasion low battery warning information.

Figure 3:
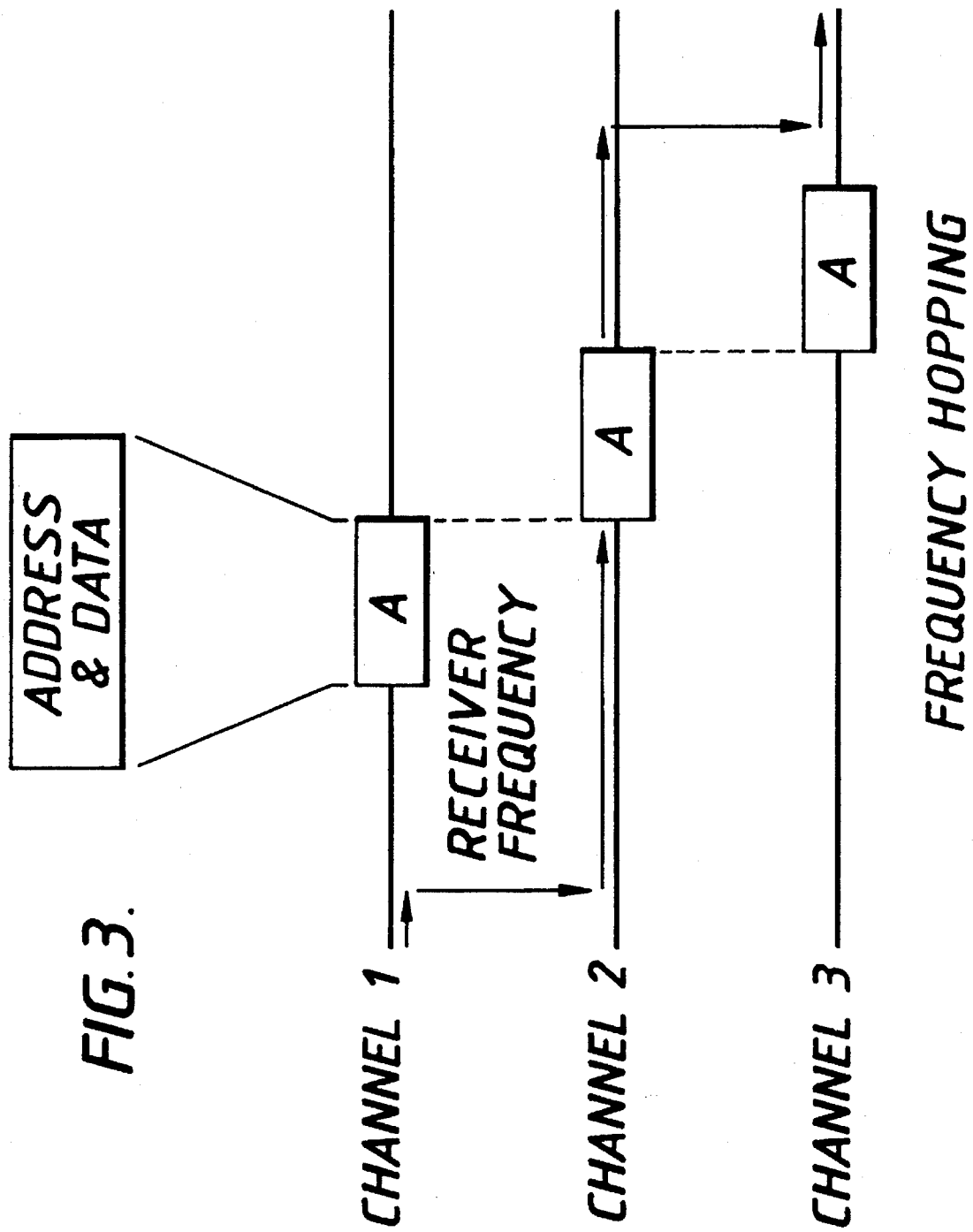
FIG. 3 shows details of the frequency hopping technique employed by the FIG. 2 arrangement.

In addition to providing transmitted signals sent using frequency shift key (FSK) techniques, to avoid possible loss of reception due to interference, frequency hopping is employed to allow the transmitted data to be sent on three separate channels. These frequencies can be stored within the memory 48 and are generated by the frequency synthesiser when required by changing the values of N to achieve the desired frequencies. A unique 22 bit word stored during manufacture can give sufficient information on the address code of the module and the transmission frequencies to be employed for a large range of modules. The transmission on each of the three channels may take the form shown in FIG. 3. A transmission on channel 1 includes address and temperature data which is repeated thereafter on channels 2 and 3. The transmissions will not be continuous but only periodically carried out, typically at five minute intervals to reduce power consumption. Similarly to conserve power and avoid self-heating effects, the thermistor circuits are only energised just prior to data transmission. In standby mode the power consumption can be as little as 100 µA so giving a year or more of operation on one set of batteries. To enhance operation (by reducing the risk that other sensor modules will be transmitting at that moment in time also) a random variation in timing can be introduced to prevent continual errors due to simultaneous transmission from other modules. This can be achieved by utilising the microprocessor 40 with an algorithm suitable for generating a pseudo random time value. To ensure integrity of the received signal information, Hamming codes and parity bits can be employed in the transmitted signal.

Although the antenna is shown in FIG. 1 as external of the module, typically it can be located within the housing and indeed may be formed on the periphery of the printed circuit board. Alternatively the loop antenna can be located in the housing at 90° to the printed circuit board, which board can then act as a ground plane to ensure omni-directional capabilities.

Figure 4:
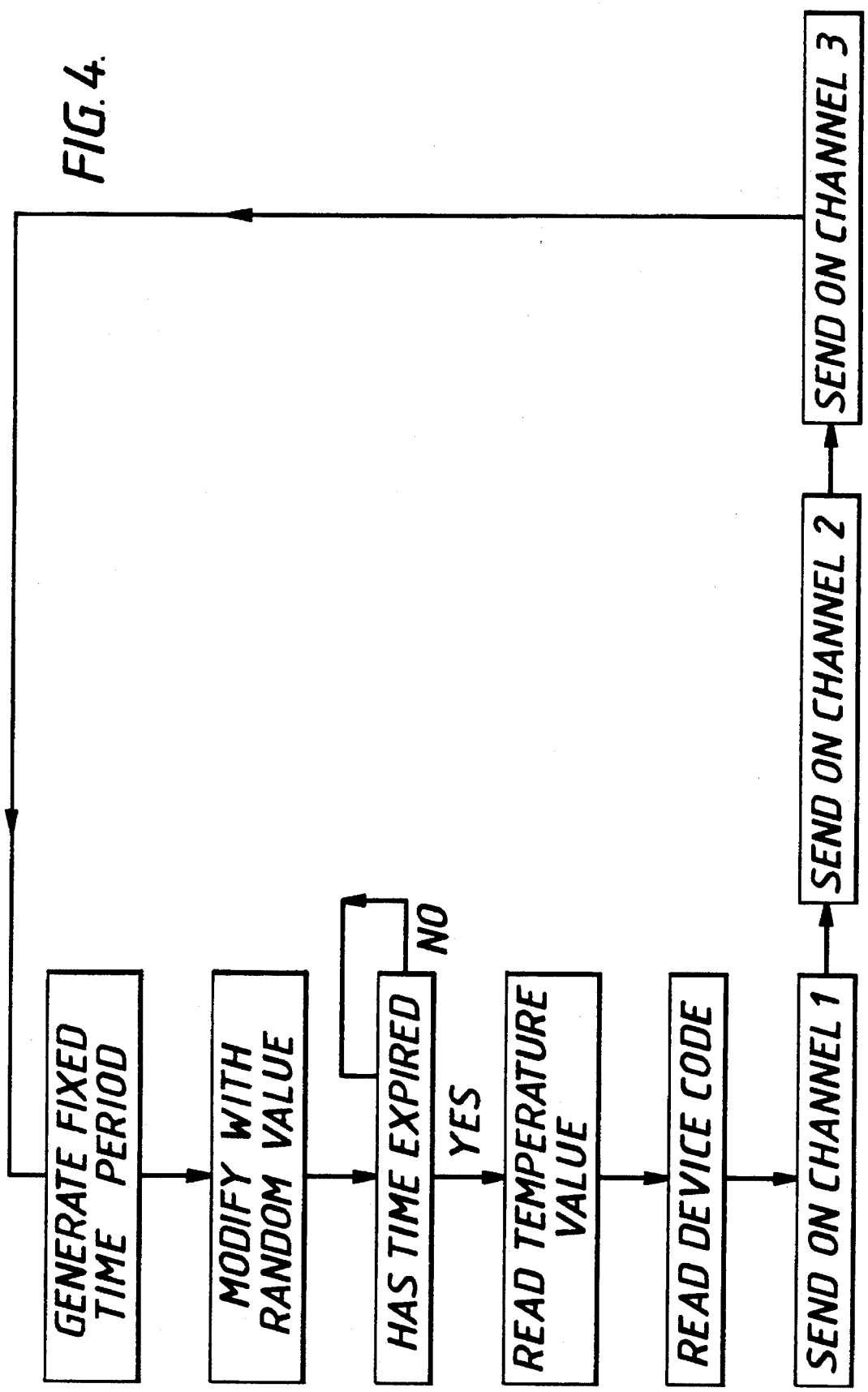
FIG. 4 shows a flow chart relating to the operation of the remote sensor.

The operation of the temperature sensor module is shown in the flow chart of FIG. 4.

Figure 5:
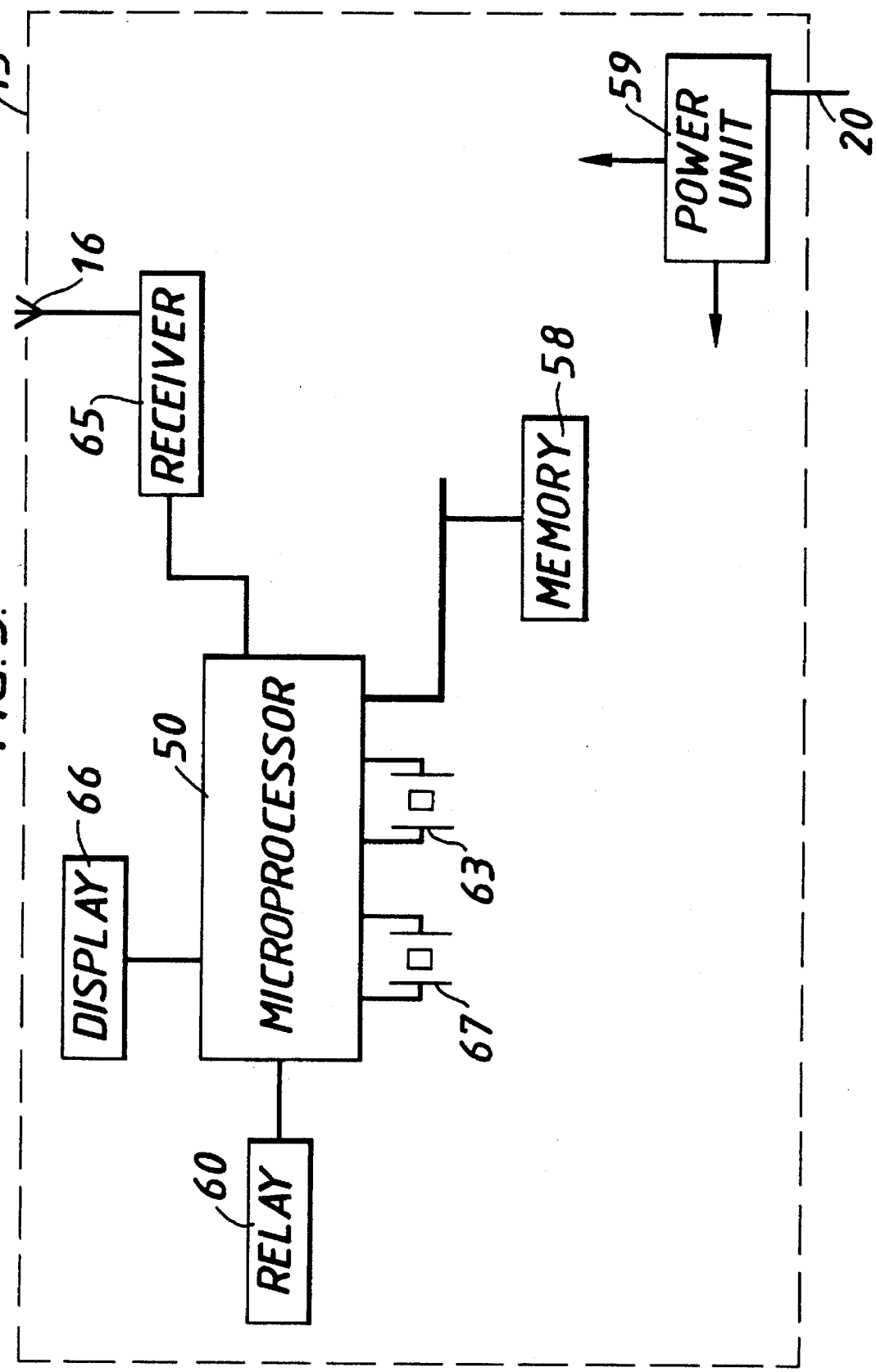
FIG. 5 shows an embodiment of the receiver configuration of FIG. 1 in more detail.

The receiver module is now shown in more detail in FIG. 5. This includes a microprocessor 50 (e.g. TMP47C850) with associated crystals 63 and 67. Memory 58 stores the selected room temperature value transmitted. The power unit 59 incorporating a transformer, rectifier and regulator utilises the mains input 20 to power the module. Relay 60 controlled by the microprocessor will provide sufficient switching power to provide thermostatic control for the control unit 18 of FIG. 1.

Because the receiver module 15 is mains powered, power consumption is not critical and hence there is continuous reception availability utilising antenna 16. A receiver 65 provides the means for receiving information from the remote temperature module 10 of FIG. 1. A single chip receiver (e.g. UAA2050T) can be employed to provide the necessary FSK offset reception to decode the transmitted data.

Figure 6:
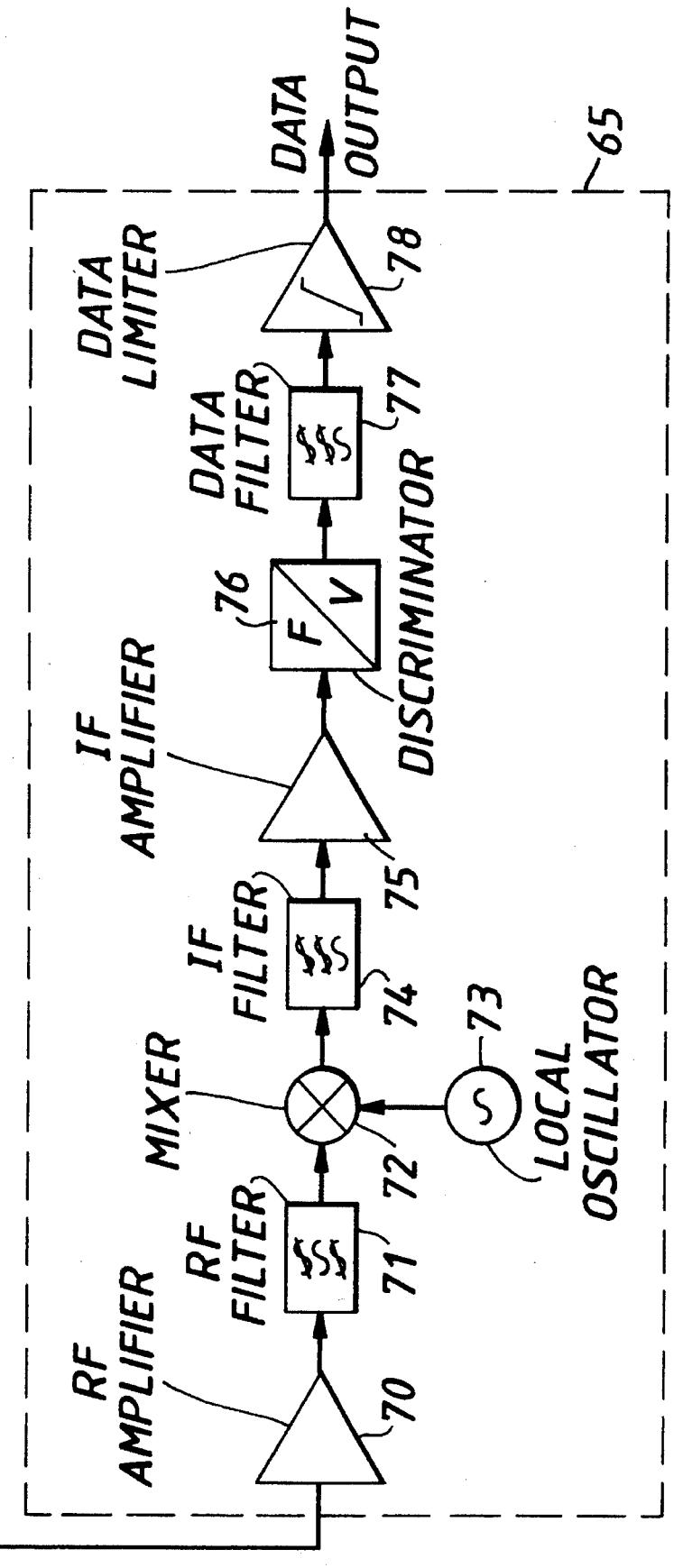
FIG. 6 shows a receiver suitable for the FIG. 5 configuration.

The operation of such a receiver is shown in FIG. 6.

The radio frequency signal carrying the data is received by antenna 17 and this passes to RF amplifier 70. The amplified signal is filtered in RF filter 71 before receipt by mixer 72 which mixes the filter output with that derived from local oscillator 73. The modified output therefrom is filtered in IF filter 74 before being amplified by IF amplifier 75 and passed to discriminator 76. This converts the output to a voltage dependent on frequency which output is passed through data filter 77 and further shaped in filter 78 to provide an unambiguous data output therefrom. The local oscillator 73 offset is chose to be half the transmitter frequency deviation. Hence the two logic levels transmitted are seen as two different audio tones and following detection are regenerated into the original data stream. Hence the temperature, address and any other transmitted information extracted is utilised by the control centre to control the heating system operation. A display 66 (see FIG. 5) comprising a number of light emitting diodes (LED) can be incorporated to indicate status (e.g. room temperature, thermostat on/off or low battery warning).

Figure 7:
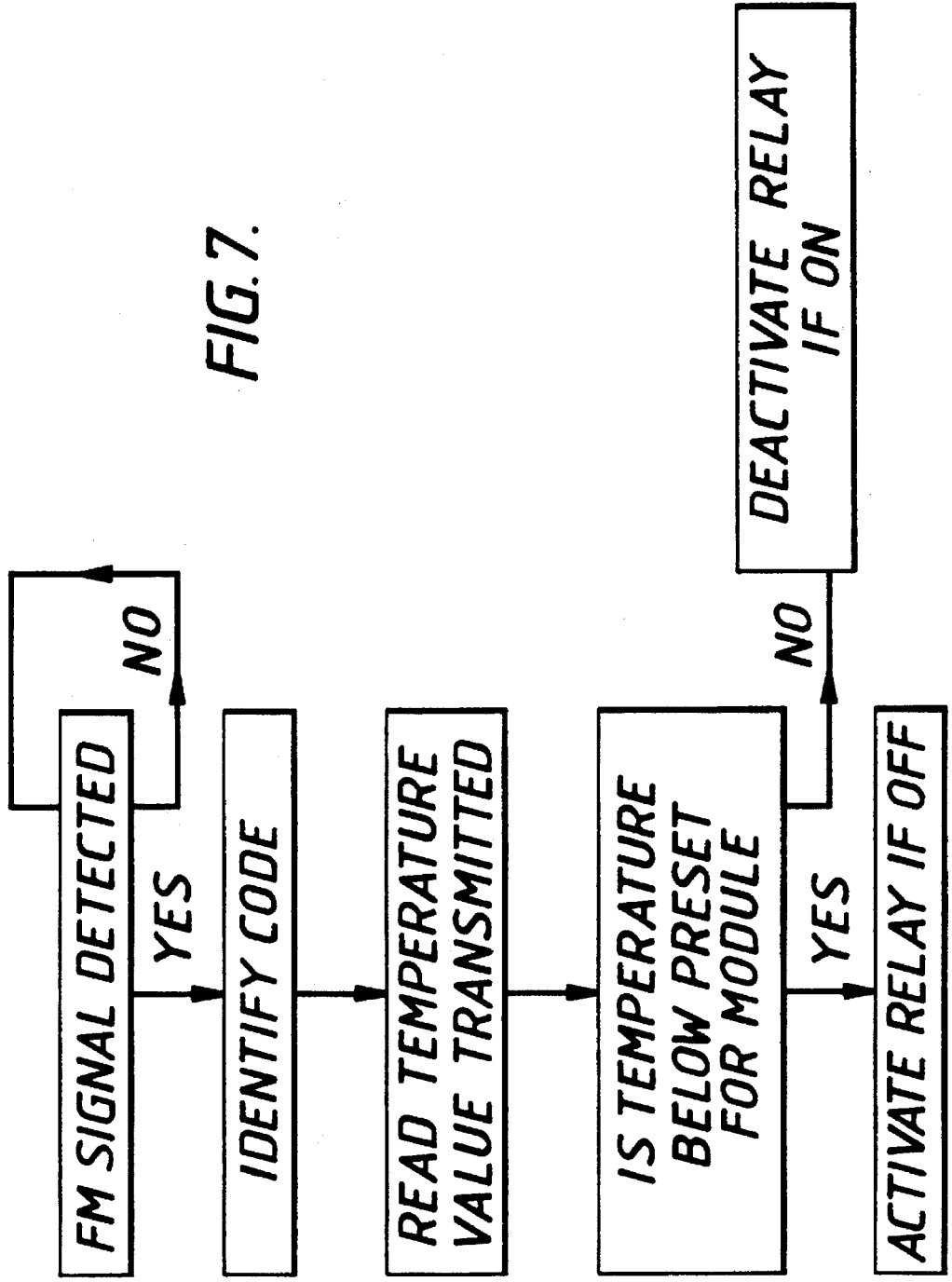
FIG. 7 shows a flow chart relating to the operation of the receiver configuration of FIG. 6.

A flow chart for temperature control operation of the receiver module is shown in FIG. 7.

As the transmission from the temperature sensor will be at (say) 5 minute intervals, this will be the maximum frequency at which the thermostat will change.

In the event that no transmissions are received due to breakdown of the temperature module or low battery status this can be indicated on the display 66 and a default setting selected within the receiver for the control device to ensure continuity of operation of the heating system.

The low battery status will be transmitted by the remote module using a specified code. This will be detected by the receiver module.

It would also be possible for the microprocessor to relearn and store in the non volatile memory 58 (see FIG. 5), the unique code associated with a sensor module in the event that such a module was replaced with one of a different code. All selected programs are also stored in the same memory.

Although the system has been described in the context of central heating, it could be utilised in cooling systems or air conditioning devices.

Figure 8:
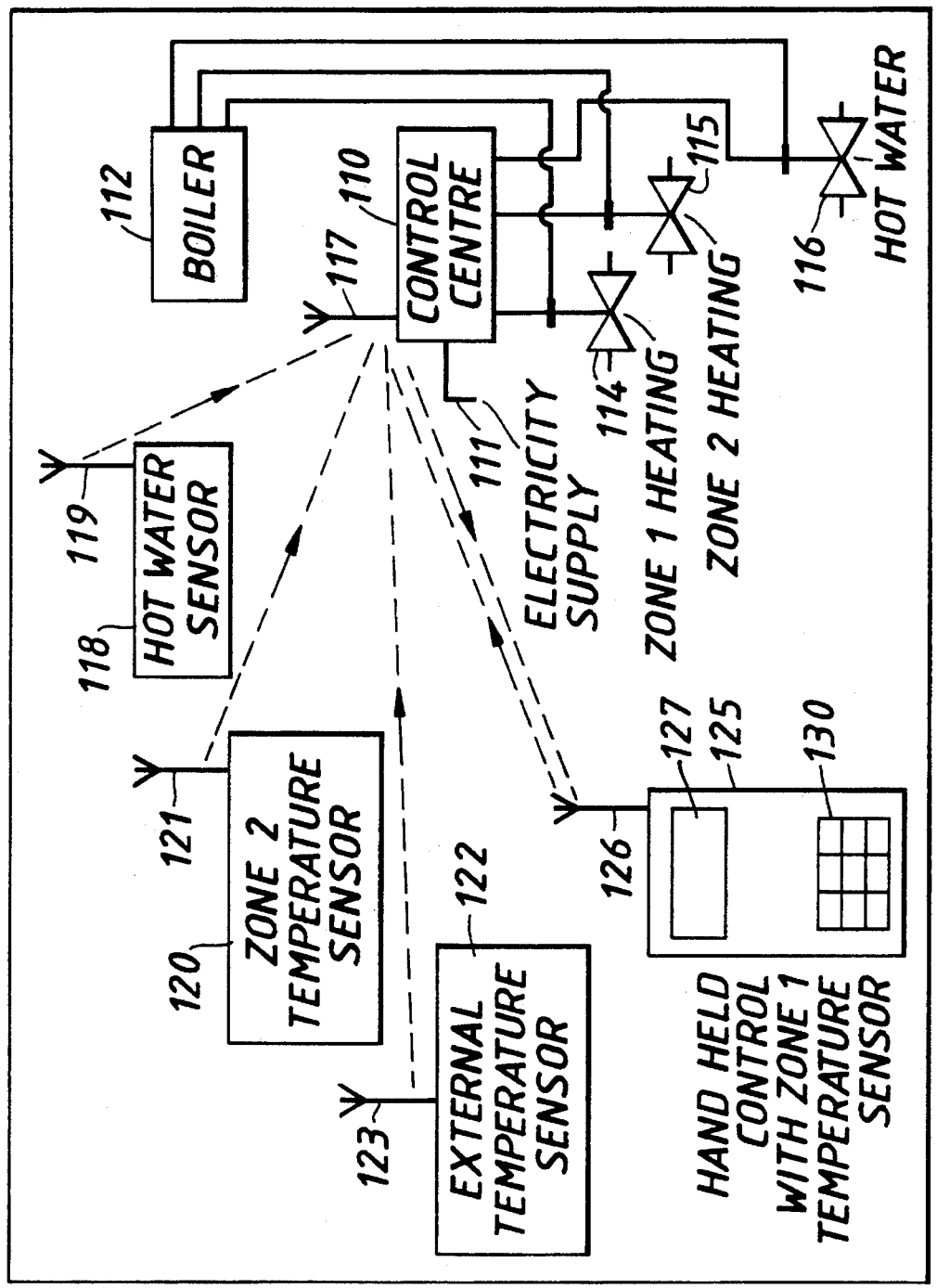
FIG. 8 shows a second embodiment of a central heating control system with a number of temperature sensors.

In a second embodiment shown in FIG. 8, a more comprehensive system is employed.

In the FIG. 8 arrangement, a central heating system is shown which includes a control centre 110 which is electrically connected to zone valves 114, 115 and 116 which in turn are connected to a boiler 112 to control operation thereof. The zone valves 114 and 115 typically control separate heating zones and gate valve 116 typically controls the heating of the domestic hot water supply.

A number of remote sensors (described in more detail below) provide temperature and other information to allow the control centre 110 to make decisions on when to operate the boiler and/or valves associated with water circulation. Temperature values to trigger operation will be stored within the control centre. The remote sensors communicate with the control centre 110 by low power radio and the signals are picked up by antenna 117. The control centre, boiler and valves will receive a mains electricity supply 111 to allow them to operate, but the remote sensors can all be operated by internal battery supplies for maximum flexibility and ease of installation.

A typical arrangement shown includes a hot water sensor module 118 which will typically be located adjacent the hot water storage cylinder. A signal indicative of the temperature will be periodically transmitted via antenna 119 to the control centre 110.

A further temperature sensor module 120 is provided at a suitable location to sense room temperature in zone 2 and this is periodically transmitted to the control centre 110 via antenna 121.

A further temperature sensor module 122 can also be provided. This has a sensor for sensing the temperature outside the building to provide additional management information for control centre 110 which information is transmitted via antenna 123. Hence outside temperature information is available to the control centre.

A hand held control module 125 is provided, typically for use in the main building zone, and is hand held to allow easy portable operation. This has an internal temperature sensor which can provide temperature information transmitted via antenna 126. In addition, however, the control can send to the control centre 110 other information such as that required to set the temperature at which the control centre will cause the boiler to start up once again or the selection of times of operation of the system or overriding thereof. The selection of this transmitted data is by means of a keypad 130. Parameters can be viewed on a display 127 which at other times can be utilised to display date and time of day to act as a clock.

Figure 9:
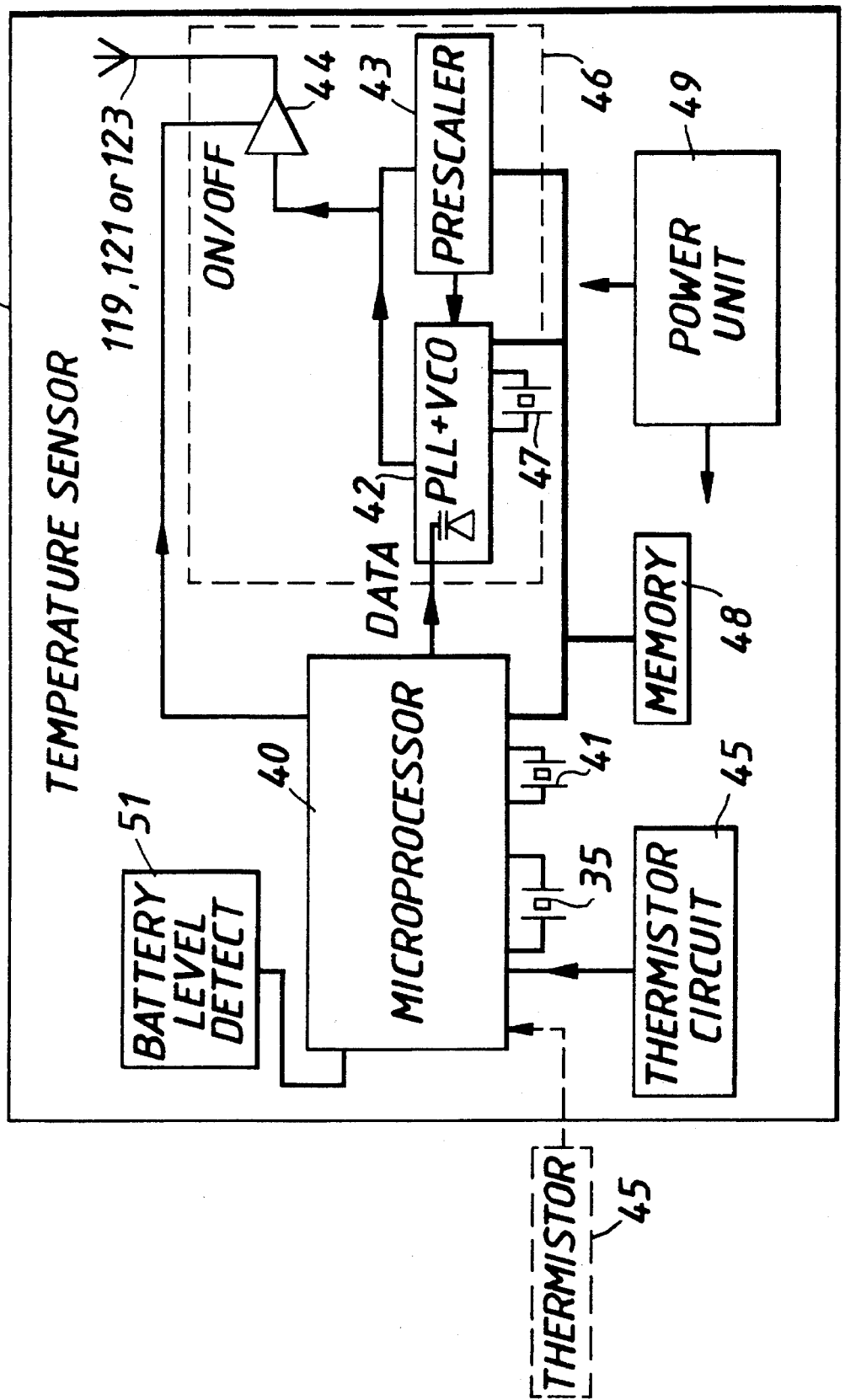
FIG. 9 shows an embodiment of a temperature sensor of Figure 8 in more detail.

The hand held control module 125 possesses no intelligence and acts purely as a terminal although it has the ability to transmit information to the control centre 110 and to receive information from it as well. This allows the user to receive confirmation from the control centre 110 via the display 127 that commands sent to the centre have been received and will be acted upon. An arrangement for configuring the remote temperature sensor modules 118, 120 and 122 of FIG. 8 is shown in FIG. 9 which is generally similar to that utilised in FIG. 2 and includes microprocessor 40 and external crystal 50. A battery level sensing circuit 51 is also provided. The thermistor circuit 45 provides a means of determining the temperature. In the case of the remote temperature sensor module 118 (of FIG. 8) which is adjacent the hot water cylinder, it is preferable for the thermistor 45 to be located some way from the module to avoid excessive heating of the module. In the case of the other modules the thermistor can be located within the module housing.

The transmitter circuit 46 includes prescaler 43, a frequency synthesiser 42, and associated crystal 47. The memory 48 provides non-volatile storage of a code identifying which particular sensor module is transmitting to ensure the main control centre is capable of determining the source. Frequency hopping is again employed to allow the transmitted data to be sent on three separate channels. These frequencies can be stored within the memory 48 also. A unique code will be stored in each remote module and is available to the microprocessor bus. The internal power unit 49, in this case a battery pack, provides power for the devices.

To enhance operation (by reducing the risk that other sensor modules will be transmitting at that moment in time also) a random variation in timing is employed to prevent continual errors due to simultaneous transmission from other modules.

The operation of the temperature sensor module of FIG. 9 will be as shown in the flow chart of FIG. 4 above. The signal sent by the appropriate temperature module is received by the main control centre 110.

Figure 10:
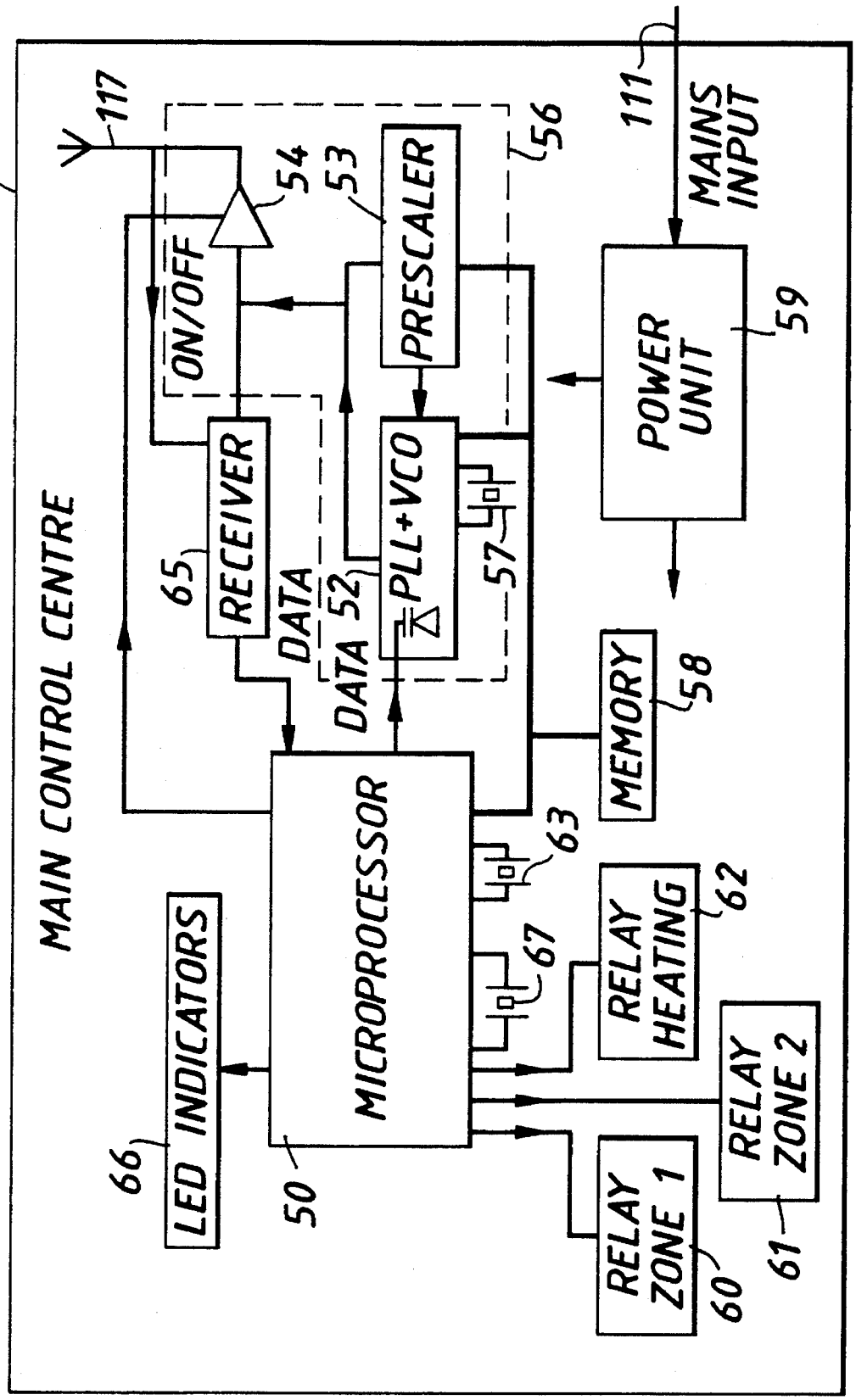
FIG. 10 shows an embodiment of the main control centre of FIG. 8 in more detail.

The control centre is now shown in more detail in FIG. 10. This includes a microprocessor 50 (e.g. TMP 47C850) with associated crystals 63 and 67, a transmitter circuit 56 including a prescaler 53, synthesiser 52 with associated crystal 57 and gated buffer/operational amplifier 54 of similar construction to those utilised in the remote temperature sensor modules. A memory 58 has a unique code stored for transmission so that this can be identified by the remote control 25 (described in more detail later) as coming from the control centre 110. Frequency hopping is again employed. The power unit 59 incorporating a transformer, rectifier and regulator utilises the mains input 111 to power the module. Relays 60–62 controlled by the microprocessor will provide sufficient switching power to actuate the valves 114–116 of FIG. 8.

Because the control centre is mains powered, power consumption is not critical and hence there is continuous reception availability as well as transmission as required. Both can share the common antenna 117. A receiver 65 provides the means for receiving information from the remote control 125 and temperature sensor modules 118, 120 and 122 of FIG. 8. A single chip receiver can be employed to provide the necessary FSK offset reception to decode the transmitted data and its operation will be as in FIG. 6 above.

Hence the temperature, address and any other transmitted information extracted is utilised by the control centre to control the heating system operation. The display 66 of FIG. 10 comprises a number of light emitting diodes (LED) to indicate status of the heating system (e.g. water only on, water and heating on, etc.).

Figure 11:
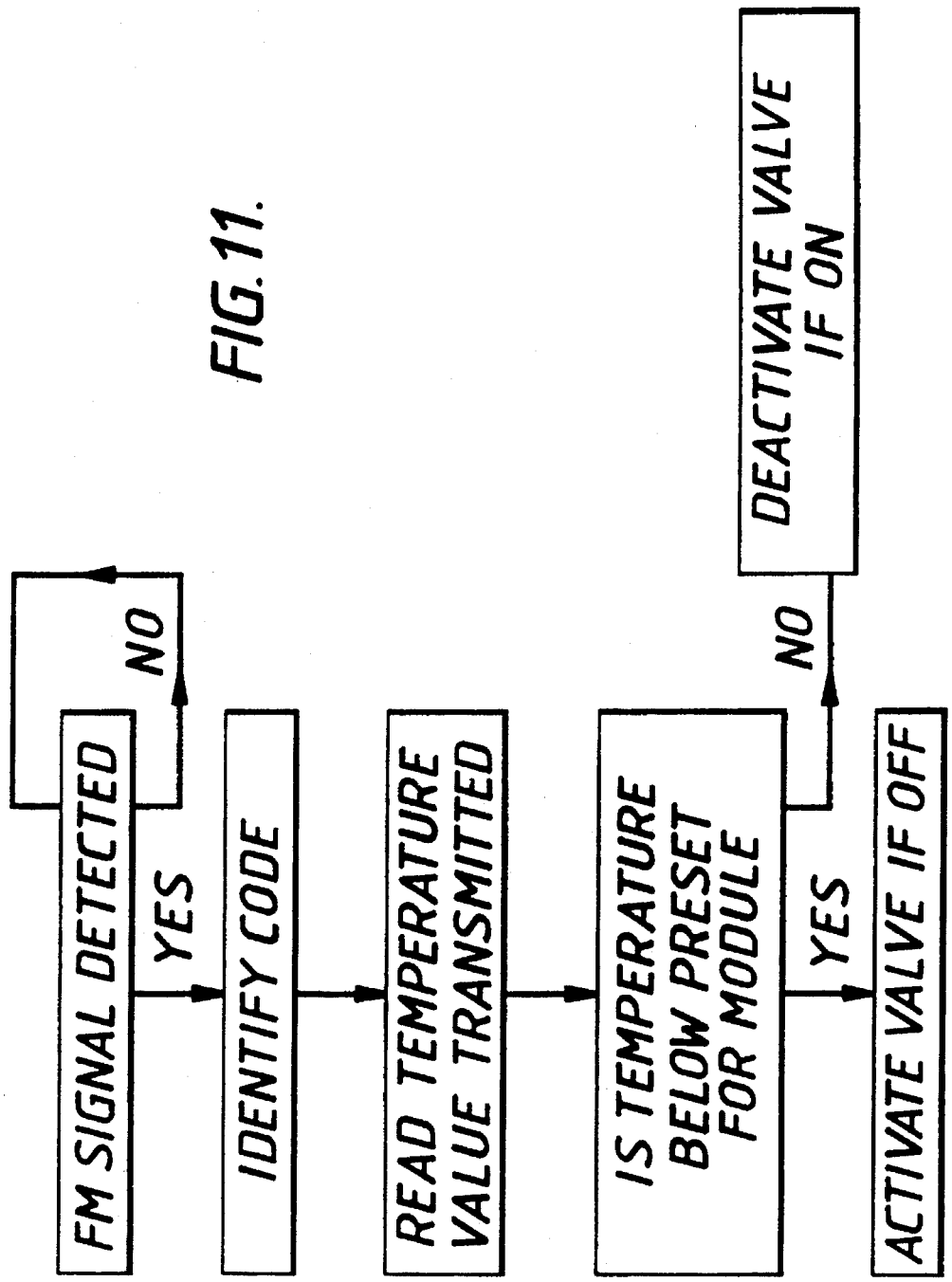
FIG. 11 shows a flow chart of the steps employed in signal reception and detection for control purposes.

A flow chart for temperature control operation of the control centre is shown in FIG. 11.

As the transmission from any one sensor will be at (say) 5 minute intervals, this will be the maximum frequency at which a particular valve will be operated which should be sufficient to prevent the system 'hunting' (i.e. switching between two states).

In the event that no transmissions are received this can be indicated on the display 66 (e.g. low battery status) and default settings selected as necessary.

The microprocessor can relearn and store in the non volatile memory 58 of FIG. 10, the unique code associated with a sensor module in the event that such a module was replaced with one of a different code.

Figure 12:
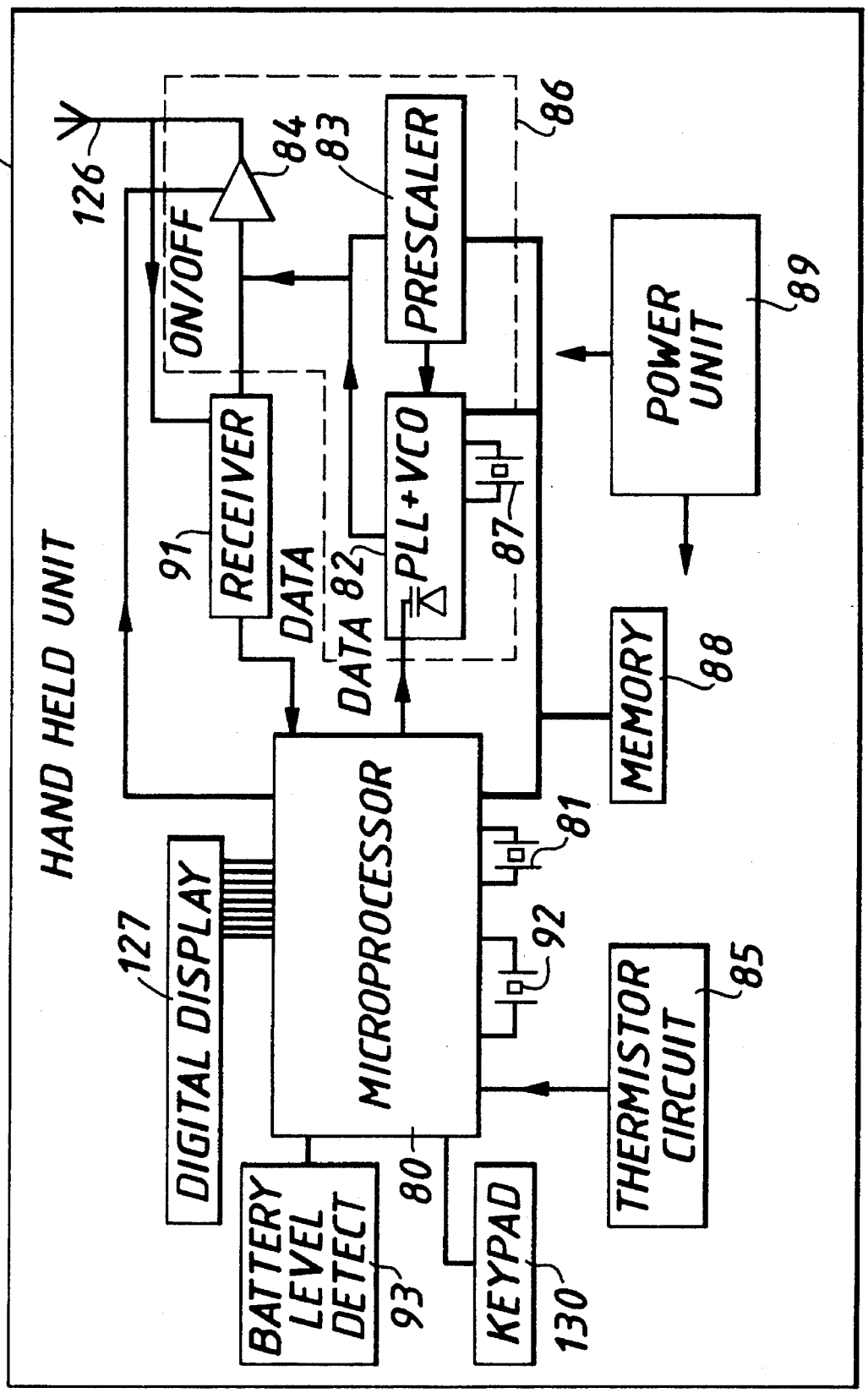
FIG. 12 shows an embodiment of the hand held control module of FIG. 8 in more detail.

The hand held remote control module 25 is shown in more detail in FIG. 12.

A microprocessor 80 with associated crystal 81, memory 88 and thermistor circuit 85 and battery level sensing circuit 93 are provided as with the other temperature sensor modules. A transmitter circuit 86 with prescaler 83, synthesiser 82 with associated crystal 87 and gated buffer/operational amplifier 84 as with earlier modules is also provided. A battery power source 89 is also provided. A receiver 91 of a type similar to that provided in the control centre 110 is also incorporated which is not present in any other remote sensing module. This is provided to allow reception of information from the control centre 110. A display 127 (e.g. liquid crystal) is provided to display parameters sent from the control centre as well as the current hot water status when required. Otherwise the display can conveniently act as a clock display.

To change temperature settings or times for operating the heating system held in the control centre 110 by means of the hand held control module 125, appropriate buttons on the key pad 130 are activated and responses from the control centre 110 sent back to the module 125 cause menu prompts in display 127 to be generated to select the parameter requiring change and after transmission of these changes, feedback from the control centre is provided to indicate that transmission of these changes has been successfully completed.

It is also possible to periodically request from the control centre to advise via display 127 of the current settings held within control centre 110. Low battery warning information from other modules can be received via the control centre. The display 127 can be used to display normal real time clock information, information on the zones (or water) such as time clock settings or temperature information.

Figure 13:
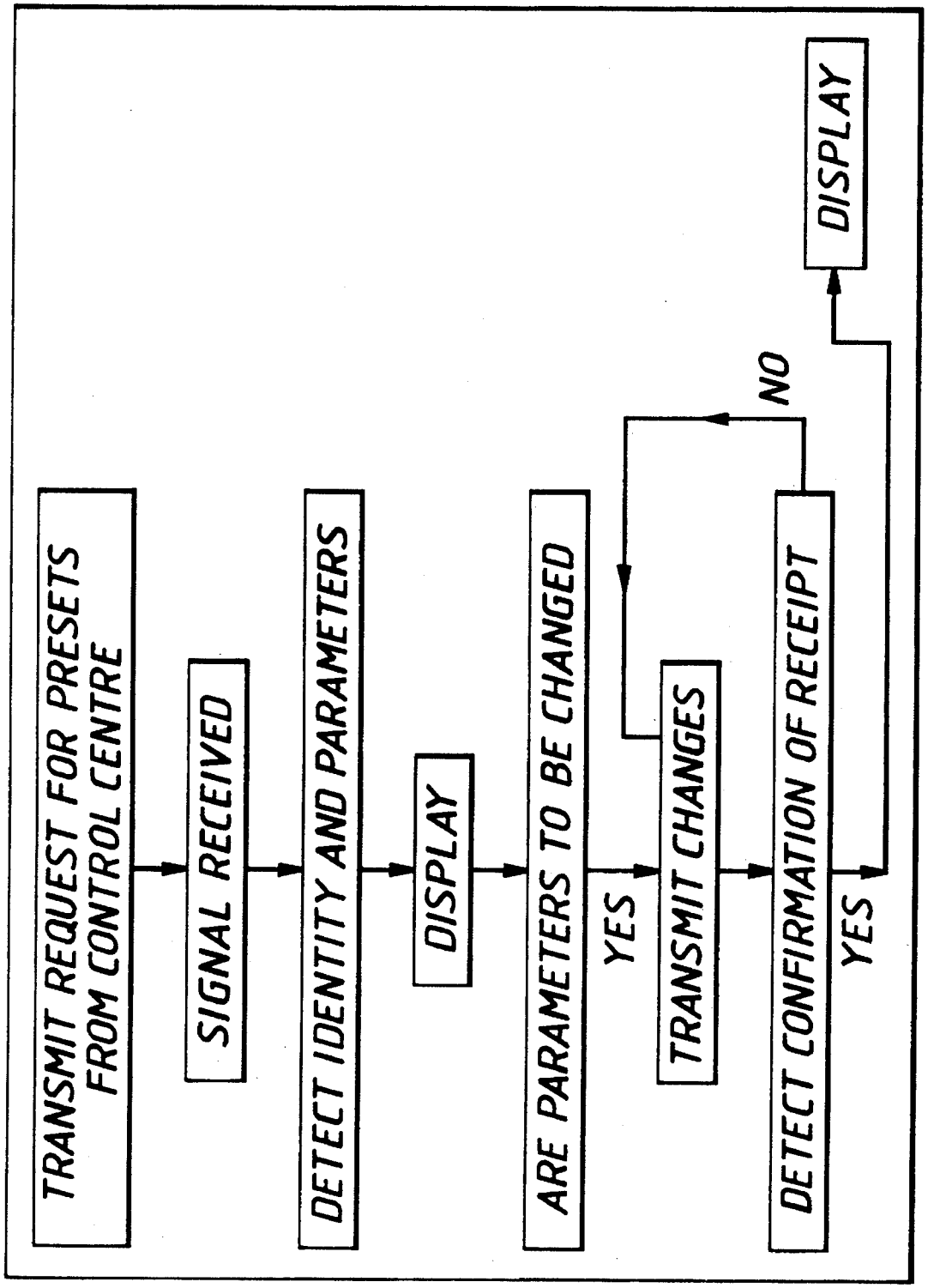
FIG. 13 shows a flow chart of the steps employed for changing preset parameters in the main control centre by utilising the hand held control.

The identity of the control centre 110 is known from the memory 88 to ensure data received is from that source and not from the remote temperature sensors 118 or 120, for example. A flow chart of the operation of the sequence within the hand held module 25 is shown in FIG. 13.

Thus to summarise, the central heating arrangement allows normal central heating controllers to be replaced by a wireless multizone system in which the need for hard wiring is substantially reduced. Transmission between the units employs identity codes with frequency hopping to send information. Memories within the units store the unique code typically entered during manufacture to identify themselves and the transmission frequencies. All remote sensor modules send identity information but do not receive information (except the hand held module which receives identity from the control centre). A word of sufficient length (e.g. 22 bits) is employed to provide a spread of codes for several thousand combinations thereof to avoid erroneous reception of signals sent from modules in adjacent buildings, for example. Transmission can be restricted to a burst every 5 minutes (with a random time factor included to minimise signal collisions) to reduce battery drain (as transmission will utilise substantially more power than in the quiescent state). The central controller and the remote control module can be taught each others codes to react only to the appropriate signals. The hand held module is arranged to receive from the central control only as a result of operation of the keypad.

Although the arrangements have been described in the context of central heating, they could be utilised in cooling systems and would have utility where humidity and other parameters may also be controlled, such as air conditioning systems.

Figure 14:
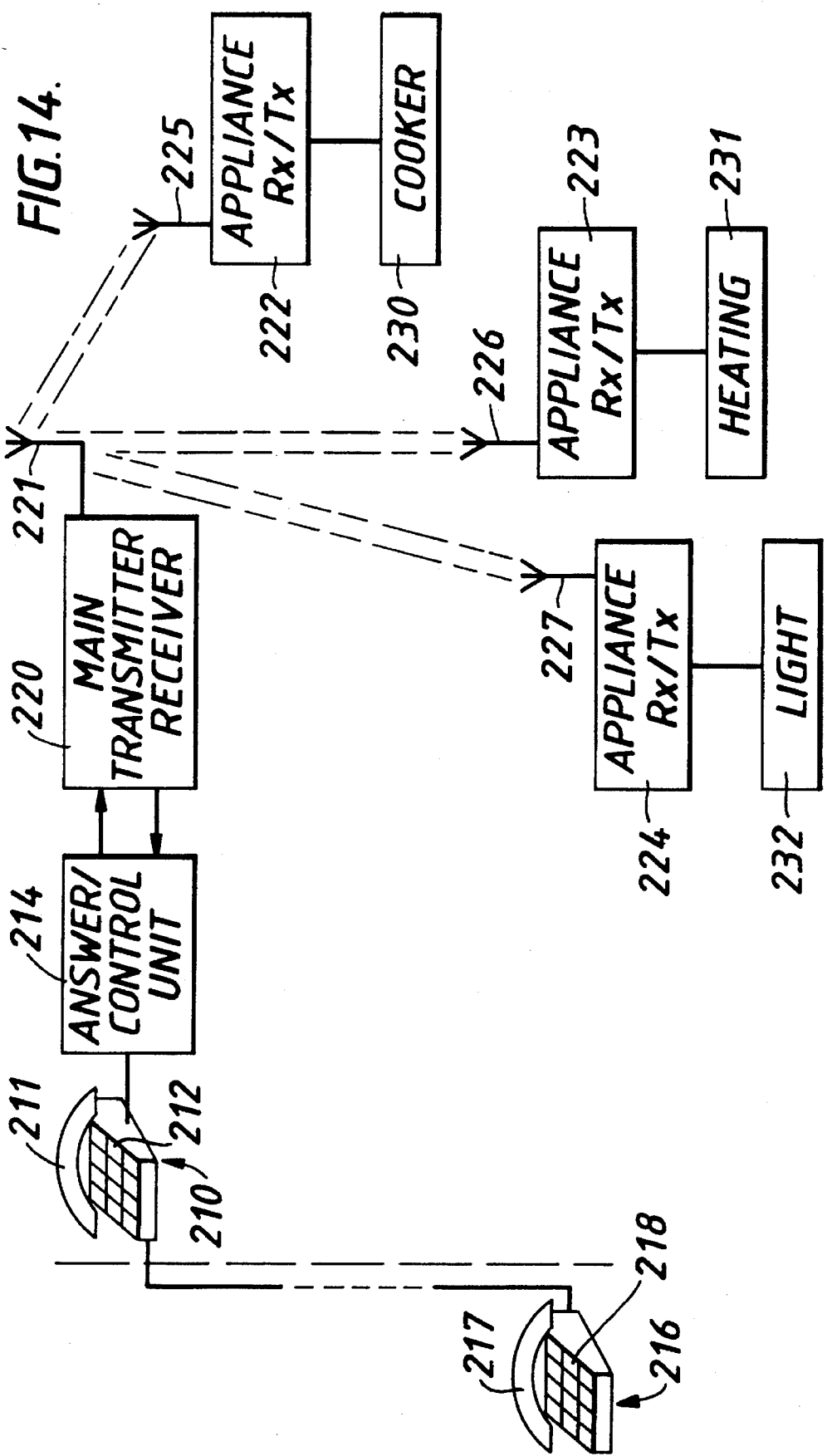
FIG. 14 shows an arrangement suitable for controlling a number of devices via the telephone.

In an alternative embodiment shown in FIG. 14 an expanded system is shown which can control additional appliances to the heating and uses a telephone link. The domestic control system shown includes a telephone 210 with handset 211 and keypad 212. The telephone is connected to an answering and control unit 214 (described in more detail below) which is capable of intercepting a call and generating message prompts to cause a caller utilising a remote telephone 216 (with handset 217 and keypad 218) to select a change in operational status of one or more devices or appliances within the home by means of the keypad 218. The telephone 216 can be at a fixed location or be a mobile instrument. The selected instruction from the telephone is utilised by the control unit 214 to activate main radio transmitter/receiver unit 220. The transmission via antenna 221 will be received by transmitter/receivers 222–224 via antenna 225–227 respectively and the appropriate device such as cooker 230, heater 231 or light 232 will be activated, switched off or otherwise controlled dependent on the coded message received.

Figure 15:
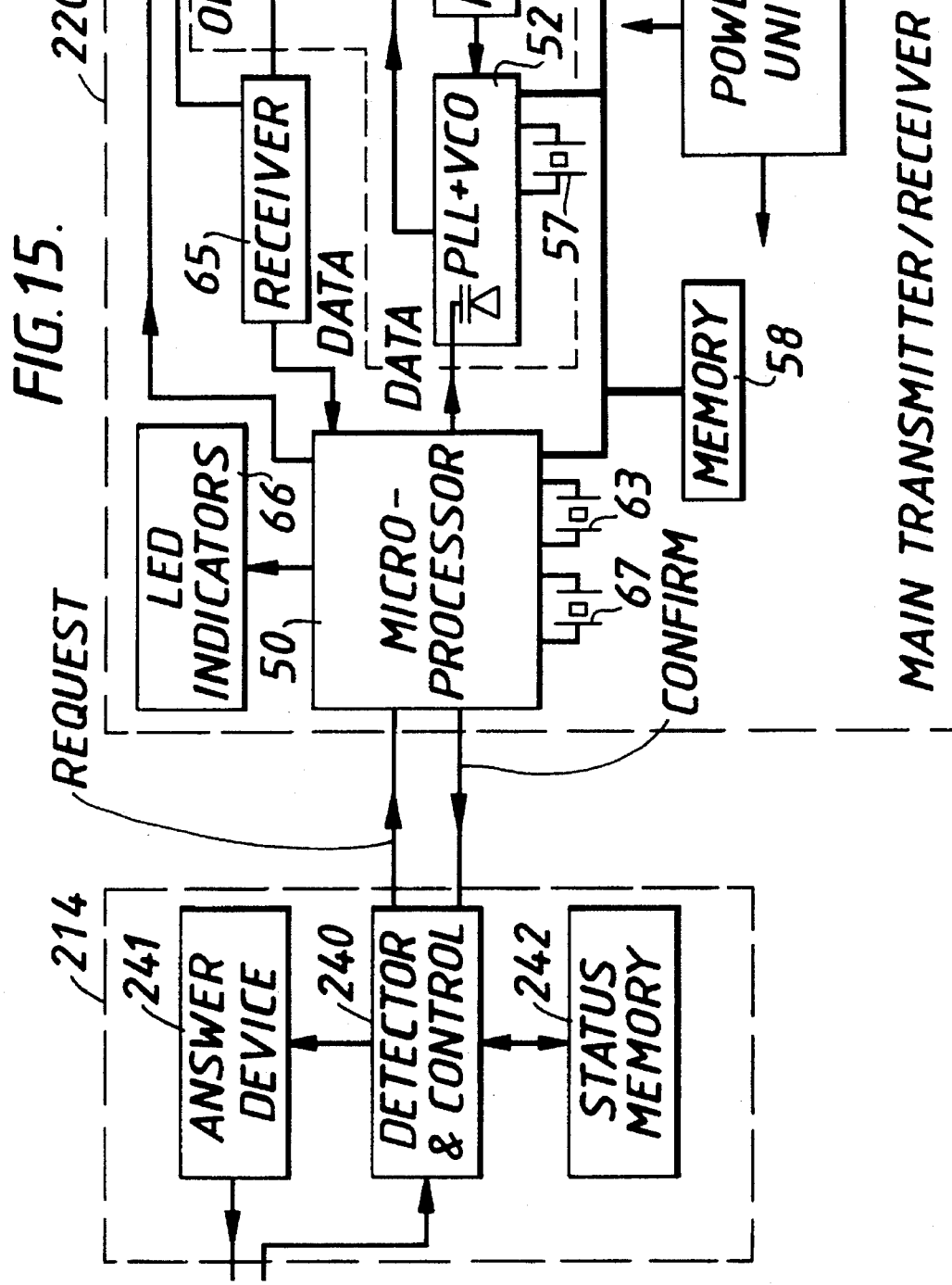
FIG. 15 shows the answering control and main transmitter/receiver device in more detail.

The way in which the answering and control unit 214 operates and the configuration of the main transmitter/receiver is shown in more detail in FIG. 15. The detector and control device 240 which is typically configured with a microprocessor, detects the ringing signal and activates the answer device 241, which may typically be of solid state construction, to output a prerecorded/synthesised message with prompts to allow the user to control an appliance. Thus the answer device may state 'The heating is OFF'. 'Press key number 1 to turn heating ON'. If key 1 is then activated by the caller, then this will be detected by block 240 and an instruction sent to activate the transmitter/receiver 220 of FIG. 14, to cause the transmitter to send an activation signal to the heating device 231 of FIG. 14 via the transmitter/receiver block 223. The receipt of the instruction by block 223 and its carrying out this instruction will be transmitted back from block 223 as an acknowledgement and is received by block 220 and this change of status is confirmed to the control 214 which updates the correct status to advise the caller and is stored in the memory 242.

Figure 16:
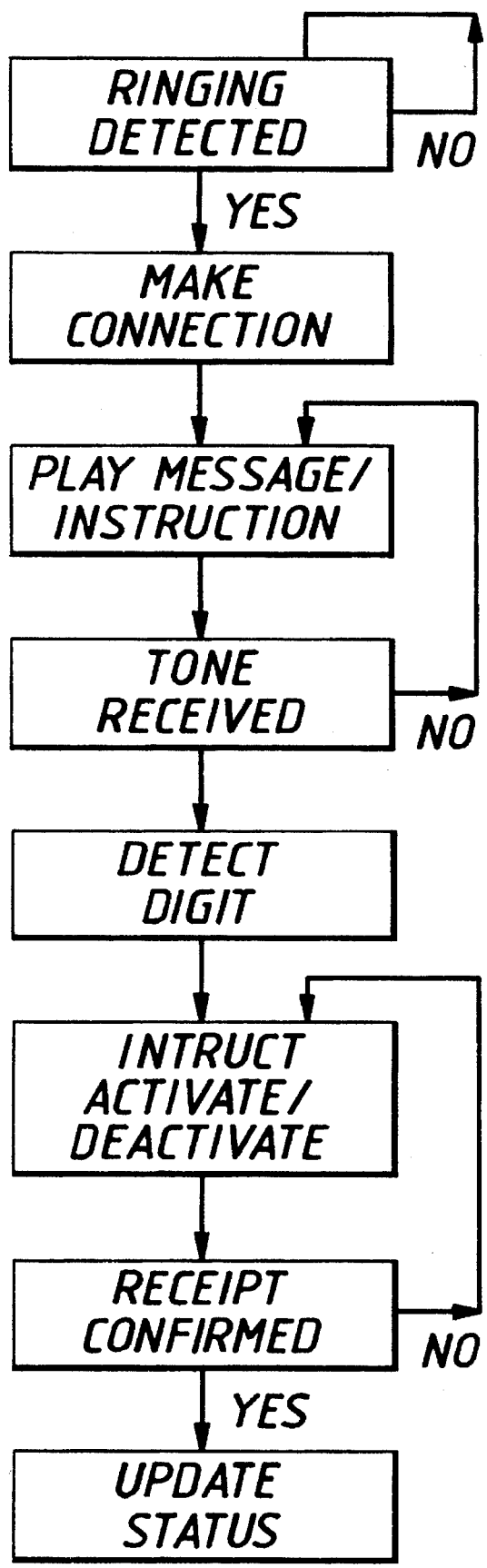
FIG. 16 shows the flow chart associated with telephone control.

A flow chart for this operation is shown in FIG. 16.

The main transmitter/receiver block 220 of FIG. 15 has similar components to the control centre of FIG. 10 above and includes a microprocessor 5, an external crystal 63 to provide an accurate fixed frequency source for clock pulse generation and an external crystal 67 for real time clock functions.

A transmitter circuit 56 includes a prescaler 53, a frequency synthesiser 52 with associated crystal 57 for an accurate fixed frequency source. A gated buffer/operational amplifier 54 receives the output from the transmitter to allow transmission of the signal when instructed by the microprocessor 50. Typically transmission could again be around 173 MHz using frequency modulation (FM) techniques. More specifically, frequency shift keying (FSK) can be employed to generate two different frequencies corresponding to the two logic states of the binary data being sent for transmission. An additional memory 58 provides non-volatile storage of a code identifying which particular transmitter module is transmitting to ensure the remote receiver is capable of determining the source. A unique code will be stored in each remote module and is available to the microprocessor bus. An internal power unit 59 transforms the mains supply to provide dc power for the devices.

To avoid possible loss of reception due to interference, frequency hopping is employed to allow the transmitted data to be sent on three separate channels. These frequencies can be stored within the memory 58 and are generated by the frequency synthesiser when required by changing the values of N to achieve the desired frequencies. A unique 22 bit word stored during manufacture can give sufficient information on the address code of the transmitting module and the transmission frequencies to be employed for a large range of modules. The transmission on each of the three channels may take the form shown in FIG. 3. A transmission on channel 1 includes transmission address and control data (identifying a particular task and a particular module 222–224 of FIG. 1) which transmission is repeated thereafter on channels 2 and 3. The transmissions will be in response to a caller's instructions and will be repeated till receipt is acknowledged. To ensure integrity of the received signal information, Hamming codes and parity bits can be employed in the transmitted signal.

A receiver 65 sharing the common antenna 221 provides the means for receiving information from the remote devices to acknowledge receipt. A single chip receiver (e.g. UAA2050T) can be employed to provide the necessary FSK offset reception to decode the transmitted data as described above in relation to FIG. 6.

The two logic levels transmitted are seen as two different audio tones and following detection are regenerated into the original data stream. Hence the address, and acknowledgement and any other transmitted information extracted is utilised by the receiver to have knowledge of the status of devices to pass to the answering system. A display 66 is incorporated to indicate status of the devices if desired.

Figure 17:
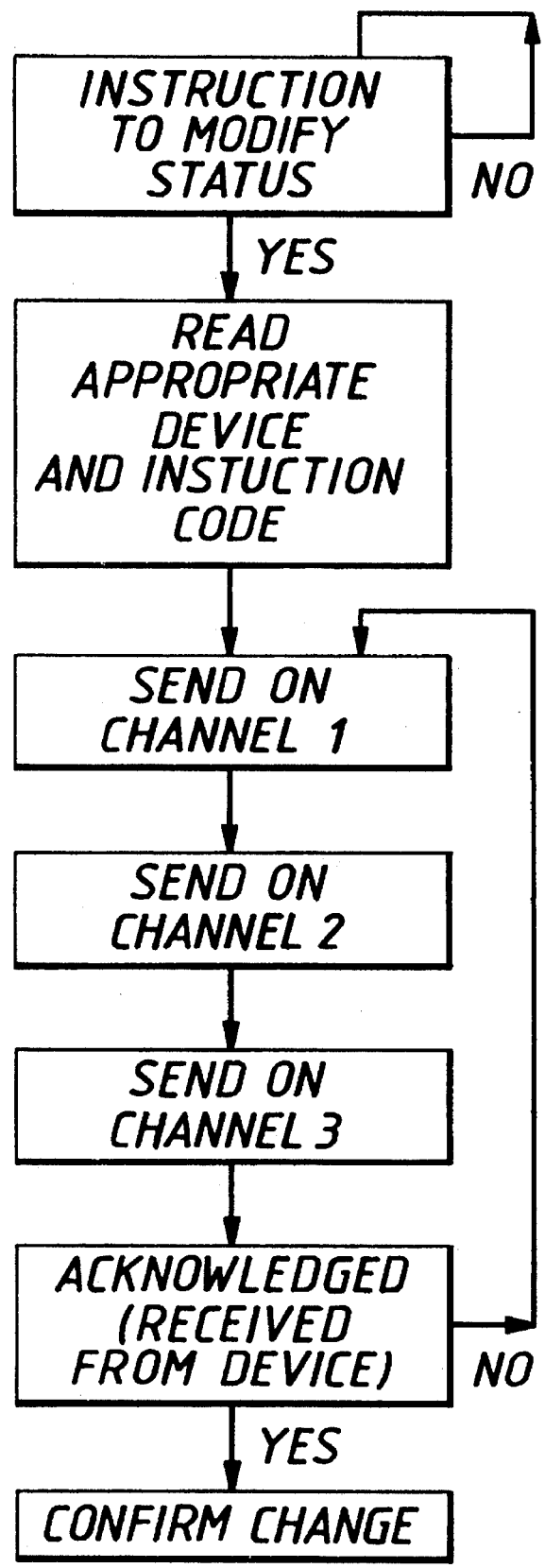
FIG. 17 shows a flow chart relating to main transmission/reception.

A flow chart illustrating the transmission and receiver arrangements is shown in FIG. 17.

Figure 18:
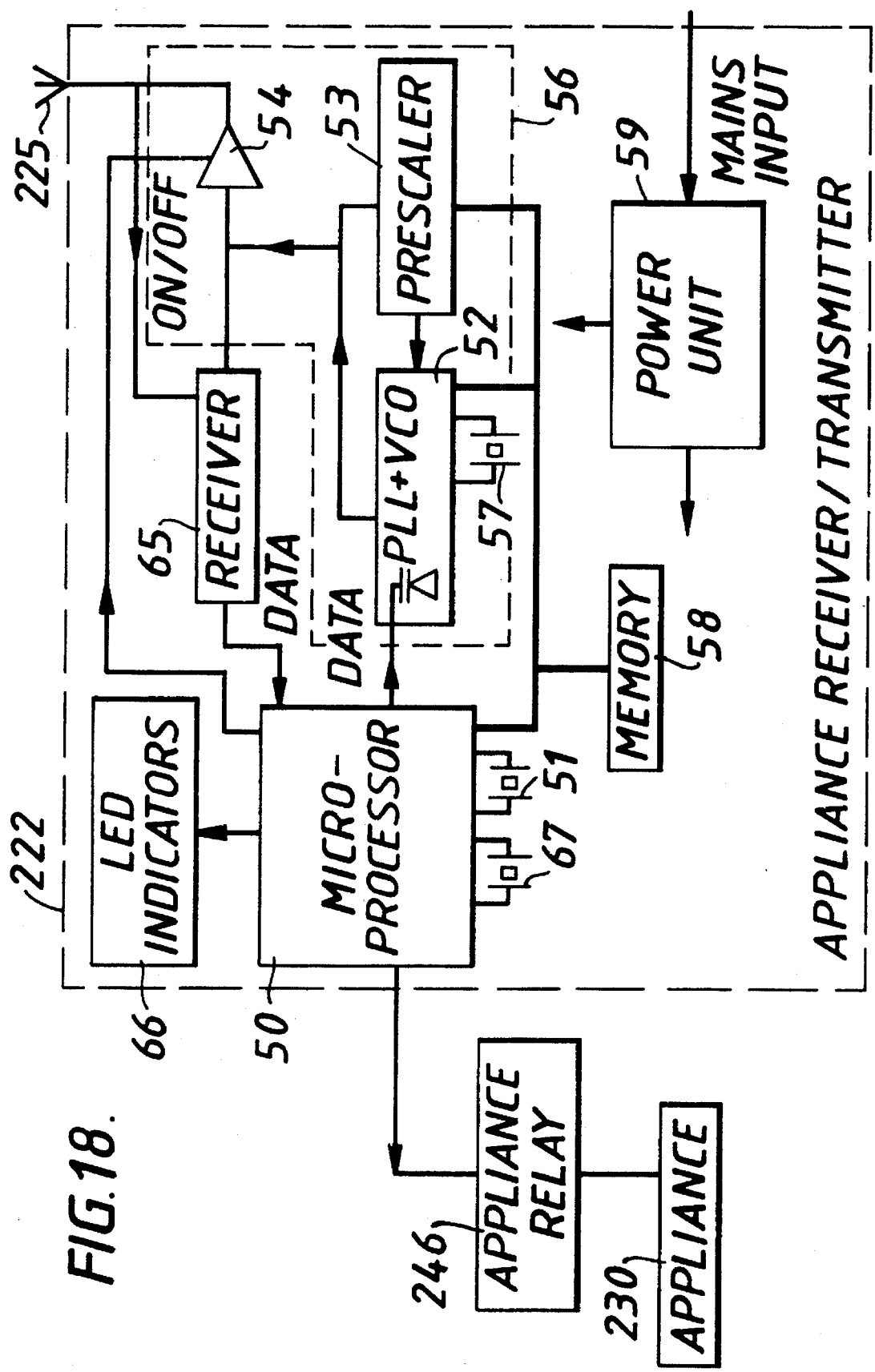
FIG. 18 shows a transmitter/receiver associated with a device or appliance.

An appliance receiver/transmitter is shown in more detail in FIG. 18. It can be seen that the hardware configuration is very similar to the device of FIG. 15 and components are similarly labelled. In addition a relay 246 is connected to switch the mains voltage to activate the appliance (e.g. cooker 230). More than one relay could be employed if a number of switching possibilities is required, as may be the case with the heating system for example.

Figure 19:
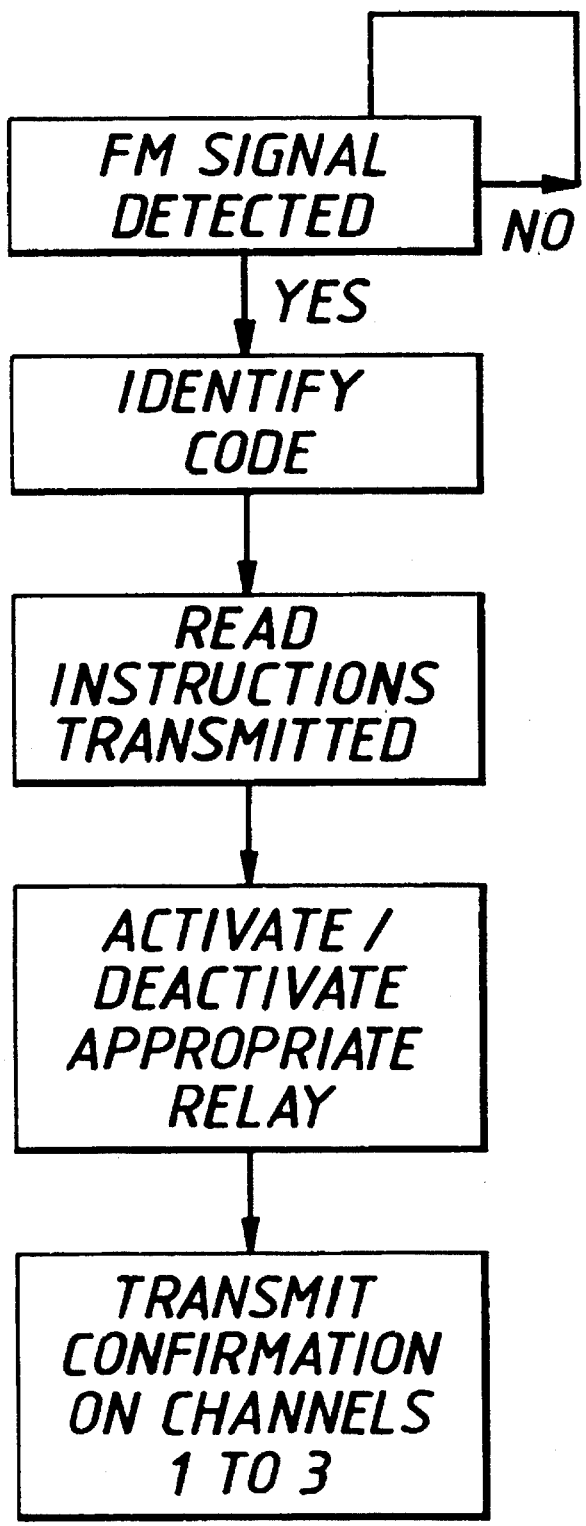
FIG. 19 shows the flow chart associated with this transmitter/receiver.

The flow chart associated with reception of instructions and activation of the appliance is shown in FIG. 19.

We claim:

1. A control system for a heating or cooling arrangement incorporating a heating/cooling device, said control system comprising: control means for providing operational control of the heating/cooling device; at least one temperature sensor device including radio transmission means remote from the control means for providing temperature information for transmission to the control means to allow said control means to receive said information to determine whether to operate the heating/cooling device, said radio transmission means including means for reducing the risk of loss of reception of the information by the control means, wherein the means for reducing the risk of loss of reception includes means for transmitting temperature data sequentially on each of a plurality of frequencies by means of selected frequency channels.

2. A system as claimed in claim 1, wherein memory means are provided to store information on said plurality of frequencies used for transmission.

3. A system as claimed in claim 2, wherein the memory means stores digital number information for a frequency synthesiser which synthesises each frequency in dependence on a digitally stored number.

4. A system as claimed in claim 1,2 or 3 wherein the means for reducing the risk of loss of reception includes means for transmitting information at variable time intervals to reduce the risk of other devices transmitting repeatedly at the same period in time.

5. A system as claimed in claim 3, wherein the time interval means includes means for periodically generating a pseudo random time value.

6. A system as claimed in claim 5, wherein the means for generating a pseudo random time value includes a microprocessor.

7. A system as claimed in claim 1, wherein the temperature sensor device is configured to transmit a unique code to accompany the temperature information to allow said control means to determine from which sensor device the information has been received.

8. A system as claimed in claim 7 wherein the temperature sensor device includes memory means for storing an identity code for accompanying the transmitted temperature data.

9. A system as claimed in claim 1 wherein the temperature sensor device includes means for setting operational parameters including temperature selection for transmission to the control means.

10. A system as claimed in claim 1 wherein display means are provided within the temperature device to indicate current and/or selected temperature.

11. A system as claimed in claim 1 wherein display means are provided for the control means to indicate operational status of the remote temperature device.

12. A system as claimed in claim 1 wherein means are provided for the control means to store identity codes for a remote temperature sensor to avoid responding to incorrect signals.

13. A system as claimed in claim 12, wherein the control means includes means for receiving and retaining new identity codes indicative of the signal source to allow new remote temperature devices to be utilised.

14. A system as claimed in claim 1, wherein the control means includes memory means for holding default operational parameters for utilisation should a remote temperature device become inoperative.

15. A system as claimed in claim 1, wherein at least one of the temperature sensor devices includes means for setting operational parameters for transmission to the control means.

16. A system as claimed in claim 15, wherein the means for setting parameters includes time and temperature selection.

17. A system as claimed in claim 15 or 16, wherein the control means includes transmission means for sending a signal indicating reception of the transmitted parameters and at least one temperature sensor device includes receiver means for receiving a signal confirming successful reception by the control means.

18. A system as claimed in claim 15, or 16, wherein the control means includes code generating means for accompanying the confirmation signal to identify the source of the confirmation signal.

19. A system as claimed in any one of claim 15 or 16, wherein the temperature sensor device includes display means provided to indicate parameters selected and to indicate correct reception thereof by the control means.

20. A system as claimed in claim 1 including a remote control sensor module, said module including means for effecting two-way communication with the control device to select operational parameters and means within the module for indicating successful reception of the selected parameter.

21. A system as claimed in claim 20, wherein interrogation means are provided within the sensor module to receive current parameter information from the control device to determine if this needs changing.

22. A system as claimed in claim 1 including means for receiving an instruction from a remote telephone for transmission by the radio transmission means to allow control to be effected.

23. A system as claimed in claim 22 including radio transmission means for acknowledging receipt by the control means for allow information thereon to be passed back to the remote telephone.

24. A system as claimed in claim 22 or 23 wherein control means are provided to allow control of a plurality of independent devices to be effected.

25. A system as claimed in claim 24 where the devices are appliances or equipment all located within a dwelling.

26. A method for controlling a heating or cooling arrangement incorporating a heating/cooling device, said method including the steps of: sensing a temperature remote from the heating/cooling device; transmitting temperature information to the device using radio signals in such a manner as to reduce the risk of loss of reception; and receiving the transmitted information to determine whether to activate/deactivate the heating/cooling device;

the temperature information being transmitted sequentially on each of a plurality of frequencies by means of selected frequency channels.

27. A method as claimed in claim 26, wherein the temperature information is transmitted at variable time intervals to reduce the risk of other devices transmitting repeatedly at the same time.

28. A method as claimed in claim 26, or 27, wherein identity code information is transmitted with the temperature information to identify the signal source.

29. A method as claimed in claims 26 to 27, including sending parameter selection signals from the sensor to the heating/cooling device and transmitting information thereon back to the sensor to allow two-way communication therebetween.

30. A method as claimed in claims 26 or 27 including sending an instruction from a remote telephone and transmitting the instruction thereafter using radio signals.

31. A telephone control system comprising means for receiving instructions from a remote telephone to effect a change in operational status of a device, means for determining the desired instruction, radio transmission means for transmitting a control signal to said device, means for receiving said control signal to effect said change in the operational status of the device, and wherein the means for receiving the wireless control signal includes sending means for acknowledging receipt of the change of status from the transmitter means for indicating to the remote telephone.

32. A system as claimed in claim 31, wherein the transmission means is configured to transmit the signal sequentially on each of a plurality of frequencies by means of selected frequency channels to reduce the risk of loss of reception due to interference.

33. A method of controlling a device comprising receiving instructions from a remote telephone to effect a change in operational status of the device, determining the desired instruction, transmitting control information to said device using radio signals, receiving the transmitted information to effect said change in the operational status of the device, sending information indicative of receipt of the change of status by radio signals, and relaying this information to the remote telephone.

34. A control system for a heating or cooling arrangement incorporating a heating/cooling device, said control system comprising: control means for providing operational control of the heating/cooling device; at least one temperature sensor device including radio transmission means remote from the control means for providing temperature information for transmission to the control means to allow said control means to receive said information to determine whether to operate the heating/cooling device, said radio transmission means including means for reducing the risk of loss of reception of the information by the control means, and wherein the means for reducing the risk of loss of reception includes means for transmitting information at variable time intervals to reduce the risk of other devices transmitting repeatedly at the same period in time.

35. A system as claimed in claim 34, wherein the time interval means includes means for periodically generating a pseudo random time value.

36. A system as claimed in claim 35, wherein the means for generating a pseudo random time value includes a microprocessor.

37. A system as claimed in claim 34, wherein the temperature sensor device is configured to transmit a unique code to accompany the temperature information to allow said control means to determine from which sensor device the information has been received and wherein the temperature sensor device includes memory means for storing an identity code for accompanying the transmitted temperature data.

38. A system as claimed in claim 34, wherein the control means includes means for receiving and retaining new identity codes indicative of the signal source to allow new remote temperature devices to be utilized.

39. A system as claimed in claim 34, wherein the control means includes memory means for holding default operational parameters for utilization should a remote temperature device become inoperative.

40. A system as claimed in claim 34, wherein the control means includes transmission means for sending a signal indicating reception of the transmitted parameters and at least one temperature sensor device includes receiver means for receiving a signal confirming successful reception by the control means, and wherein the control means includes code generating means for accompanying the confirmation signal to identity the source of the confirmation signal.

41. A method for controlling a heating or cooling arrangement incorporating a heating/cooling device, said method including the steps of:

sensing a temperature remote from the heating/cooling device;

transmitting temperature information to the device using radio signals in such a manner as to reduce the risk of loss of reception; and receiving the transmitted information to determine whether to activate/deactivate the heating/cooling device, and wherein the temperature information is transmitted at variable time intervals to reduce the risk of other devices transmitting repeatedly at the same time.

42. A control system for a heating or cooling arrangement including:

control means for providing operational control; a hand held control unit having transmitter means therein for transmitting information requests to the control means;

receiver means in said hand held control unit for receiving information including identity information from the control means;

display means within the hand held unit for visual indication of at least some of said received information;

means within the hand held unit for modifying the information whereby the control information can be changed by transmission of a signal to the control means;

temperature sensor means within the hand held unit for transmitting temperature information to said control means, said transmitter and receiver means being configured to reduce the risk of reception being lost.

43. A control system for controlling a plurality of devices within a dwelling and comprising:

central control means for providing operational control for each of said devices, said devices including a heating/cooling arrangement;

radio transmission means for sending information from the control means;

receiver means associated with each device for receiving information from the central control means for operating the associated device, radio transmission means associated with each device to send information on operational status of the device, said transmission means including means for sending information at randomized transmission times to reduce the risk of transmission loss;

remote telephone means for transmitting commands to the central control means, and said control means being configured to transmit to the remote telephone means indicative of correctly executed commands.

\* \* \* \* \*

UNITED STATES PATENT AND TRADEMARK OFFICE
CERTIFICATE OF CORRECTION

PATENT NO. : 5,595,342
DATED : JANUARY 21, 1997
INVENTOR(S) : McNAIR ET AL

It is certified that error appears in the above-identified patent and that said Letters Patent is hereby corrected as shown below:

Column 6, line 52, change "reception" to --reception--.

Column 7, line 32, after "others" insert--'--.

Column 10, line 48, change "for allow" to --to allow--.

Column 12, line 12, change "identity" to --identify--.

Signed and Sealed this

Second Day of February, 1999

Attest:

Attesting Officer

*Acting Commissioner of Patents and Trademarks*